United States Patent
Iwasaki et al.

(10) Patent No.: US 10,946,819 B2
(45) Date of Patent: Mar. 16, 2021

(54) IN-VEHICLE SYSTEM

(71) Applicant: Yazaki Corporation, Tokyo (JP)

(72) Inventors: Katsuyuki Iwasaki, Shizuoka (JP); Masashi Nakamura, Tochigi (JP); Satoshi Enomoto, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/669,456

(22) Filed: Oct. 30, 2019

(65) Prior Publication Data

US 2020/0172033 A1 Jun. 4, 2020

(30) Foreign Application Priority Data

Nov. 29, 2018 (JP) .............................. JP2018-222988

(51) Int. Cl.
| | |
|---|---|
| *B60L 1/00* | (2006.01) |
| *B60R 16/03* | (2006.01) |
| *H02G 3/08* | (2006.01) |
| *H01R 25/00* | (2006.01) |

(52) U.S. Cl.
CPC .............. *B60R 16/03* (2013.01); *B60L 1/006* (2013.01); *H02G 3/08* (2013.01); *H01R 25/006* (2013.01)

(58) Field of Classification Search
CPC .... B60L 1/00; B60L 1/006; B60L 1/02; B60L 1/04; B60L 1/06; B60L 1/08; B60L 1/14; B60L 1/16; B60R 16/02; B60R 16/0238; B60R 16/0239; B60R 16/03; B60R 16/033; H01R 25/006; H02G 3/08
See application file for complete search history.

(56) References Cited

U.S. PATENT DOCUMENTS

| | | | | |
|---|---|---|---|---|
| 5,561,363 | A * | 10/1996 | Mashino | H02J 7/1438 322/25 |
| 5,856,711 | A * | 1/1999 | Kato | H02H 3/087 307/10.6 |
| 2013/0179033 | A1 * | 7/2013 | Williams | B60R 16/03 701/36 |
| 2016/0059807 | A1 | 3/2016 | Iwasaki et al. | |
| 2017/0033592 | A1 * | 2/2017 | Yoon | H02J 7/1446 |
| 2018/0086290 | A1 * | 3/2018 | Makke | B60R 16/0315 |
| 2018/0120797 | A1 * | 5/2018 | Morita | G05B 19/0426 |

(Continued)

FOREIGN PATENT DOCUMENTS

| | | |
|---|---|---|
| DE | 43 26 327 A1 | 9/1994 |
| JP | 2005-323435 A | 11/2005 |

(Continued)

*Primary Examiner* — Levi Gannon
(74) *Attorney, Agent, or Firm* — Kenealy Vaidya LLP

(57) ABSTRACT

An in-vehicle system includes a power supply box provided in a vehicle, and having a plurality of device connectors and a controller that supplies, to the plurality of device connectors, power received from a power supply, and a switch that switches between a cut off and a permission of power supplied to the plurality of device connectors in the power supply box. When power supplied to the device connectors is permitted by the switch, the controller performs a connection target validation process of identifying a type of a connection target device connected to each of the device connectors and a position of the device connector to which the connection target device is connected.

6 Claims, 2 Drawing Sheets

(56) References Cited

U.S. PATENT DOCUMENTS

| | | | |
|---|---|---|---|
| 2018/0201209 A1* | 7/2018 | Jyumonji | B60R 16/03 |
| 2018/0281773 A1* | 10/2018 | Bell | B60W 20/13 |
| 2018/0323626 A1* | 11/2018 | Suen | H02J 7/0044 |
| 2018/0334114 A1 | 11/2018 | Sugimoto | |
| 2019/0118744 A1 | 4/2019 | Takamatsu et al. | |
| 2019/0126857 A1* | 5/2019 | Ikegaya | B60R 16/023 |
| 2020/0099253 A1* | 3/2020 | Mizutani | H02J 13/0003 |
| 2020/0198561 A1* | 6/2020 | Weed | G06F 13/4282 |

FOREIGN PATENT DOCUMENTS

| | | |
|---|---|---|
| JP | 2009-83789 | 4/2009 |
| JP | 2016-43872 A | 4/2016 |
| WO | 2017/222074 A1 | 12/2017 |

* cited by examiner

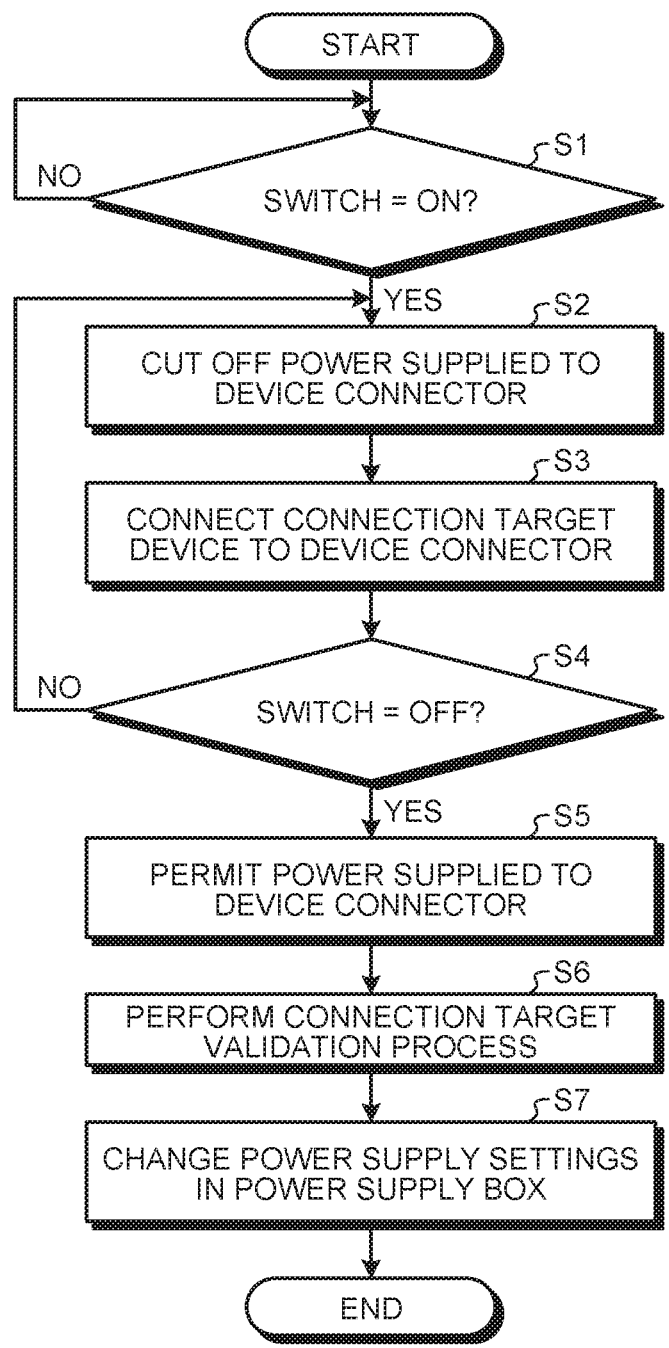

IN-VEHICLE SYSTEM

CROSS-REFERENCE TO RELATED APPLICATION(S)

The present application claims priority to and incorporates by reference the entire contents of Japanese Patent Application No. 2018-222988 filed in Japan on Nov. 29, 2018.

BACKGROUND OF THE INVENTION

1. Field of the Invention

The present invention relates to an in-vehicle system.

2. Description of the Related Art

With the advancement of automatic driving and driving support technology, electronic devices mounted on vehicles are increasing. Electric power is supplied to each electronic device mounted on the vehicle from a power supply via a power supply box.

Japanese Patent Application Laid-open No. 2016-43872 discloses techniques relating to a vehicle power control system including a customization information holding unit that holds customization information, and a power control unit that controls distribution of power based on an operation specification defined in the customization information. According to the vehicle power control system of Japanese Patent Application Laid-open No. 2016-43872, since the form to which power is to be supplied can be changed according to the connected load or the electronic control unit, there is no need to prepare multiple types of electrical connection boxes with different circuit configurations assuming a combination of vehicle types and vehicle specifications.

In the in-vehicle system, it is desired that a connection target device such as an electronic device can be easily added with respect to the power supply box.

SUMMARY OF THE INVENTION

An object of the present invention is to provide an in-vehicle system capable of easily adding a connection target device with respect to a power supply box.

In order to achieve the above mentioned object, an in-vehicle system according to one aspect of the present invention includes a power supply box provided in a vehicle, and having a plurality of device connectors and a controller that supplies, to the plurality of device connectors, power received from a power supply; and a switch that switches between a cut off and a permission of power supplied to the plurality of device connectors in the power supply box, wherein when power supplied to the device connectors is permitted by the switch, the controller performs a connection target validation process of identifying a type of a connection target device connected to each of the device connectors and a position of the device connector to which the connection target device is connected.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWING

FIG. 2 is a flowchart illustrating an example of control performed by the in-vehicle system according to the embodiment.

DETAILED DESCRIPTION OF THE PREFERRED EMBODIMENTS

Figure 1:
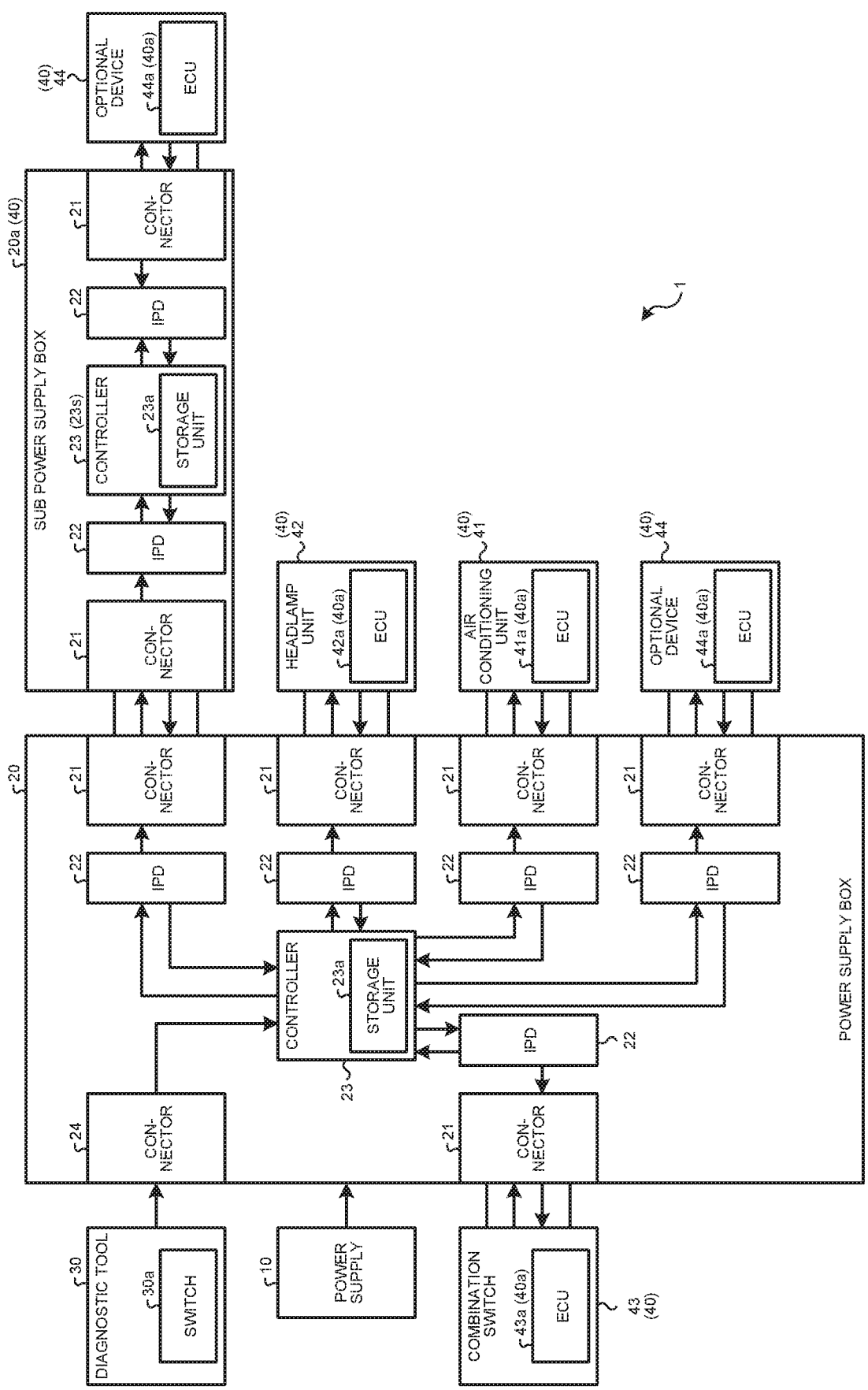
FIG. 1 is a conceptual block diagram illustrating an in-vehicle system according to an embodiment.

Hereinafter, an in-vehicle system according to embodiments of the present invention will be described in detail with reference to the drawings. The present invention is not limited by the embodiments. In addition, constituent elements in the following embodiments include those that can be easily conceived by those skilled in the art or those that are substantially the same.

Embodiments

Embodiments will be described with reference to FIGS. 1 and 2. The embodiments relate to an in-vehicle system. FIG. 1 is a conceptual block diagram illustrating an in-vehicle system according to an embodiment. FIG. 2 is a flowchart illustrating an example of control performed by the in-vehicle system according to the embodiment.

An in-vehicle system 1 according to an embodiment is applied to a vehicle and controls a supply of power to a plurality of connection target devices mounted on the vehicle. The vehicle to which the in-vehicle system 1 is applied is any vehicle that uses a motor or an engine as a drive source, such as an electric vehicle (EV), a hybrid vehicle (HEV), a plug-in hybrid vehicle (PHEV), a gasoline vehicle, and a diesel vehicle. Further, the driving operation of the vehicle to which the in-vehicle system 1 is applied may be any of a manual driving by a driver, a semi-automatic driving, and an automatic driving.

As illustrated in FIG. 1, the in-vehicle system 1 includes a power supply 10, a power supply box 20, and a switch 30a. The power supply 10 is mounted on a vehicle. The power supply 10 is a power storage device, and charges and discharges electric power. For example, as the power supply 10, a lead battery, a nickel hydrogen battery, a lithium ion battery, or the like can be used. Further, the power supply 10 may include a power generation source such as a generator or an alternator.

The power supply box 20 is a so-called electrical connection box. A plurality of connection target devices 40 is connected to the power supply box 20. The power supply box 20 has a current distribution function of distributing the power received from the power supply 10 to a plurality of connection target devices 40 connected to the power supply box 20. The power supply box 20 according to the embodiment includes a plurality of device connectors 21, a plurality of intelligent power devices (IPD) 22, and a controller 23.

The device connector 21 is a connector to which the connection target device 40 is connected. A general in-vehicle connector can be used as the device connector 21. In the embodiment, each device connector 21 has an identical configuration with each other. In the device connector 21, "identical configuration" means that the shape, the structure, and the size are substantially the same.

The power supply box 20 distributes power to the plurality of connection target devices 40 via the device connectors 21. That is, the power supply box 20 supplies power received from the power supply 10 to the plurality of device connectors 21. The connection target device 40 connected to the device connector 21 receives the power from the power supply 10 through the device connector 21. Each connection target device 40 is driven by the power distributed by the power supply box 20.

The plurality of connection target devices 40 includes a load device incorporating an electronic control unit (ECU) 40a, and a sub power supply box 20a. The load device of the embodiment includes an air conditioner unit 41, a headlamp unit 42, a combination switch 43, and an optional device 44. Each load device incorporates its own electronic control unit 40a. That is, the air conditioner unit 41 incorporates an air conditioner ECU 41a that controls the air conditioner unit 41, the headlamp unit 42 incorporates a headlamp ECU 42a that controls the headlamp unit 42, the combination switch 43 incorporates a combination switch ECU 43a that controls the combination switch 43, and the optional device 44 incorporates an option ECU 44a that controls the optional device 44. Here, the optional device 44 is a load device mounted on the vehicle at a retrofit, such as a car navigation system or a head-up display device. The sub power supply box 20a has substantially the same configuration as the power supply box 20. In FIG. 1, for simplification of the figure, some components in the sub power supply box 20a are omitted. As in the power supply box 20, the connection target device 40 is connected to the sub power supply box 20a. In the embodiment, the optional device 44 is connected to the sub power supply box 20a. Power from the power supply box 20 is distributed to the optional device 44 connected to the sub power supply box 20a via the sub power supply box 20a.

The intelligent power device 22 is constituted by a semiconductor circuit, and includes a function of detecting the current value of the current flowing to the output, a fuse function and a gate driver. One or more intelligent power devices 22 are connected to each of the device connectors 21. In the embodiment, the intelligent power devices 22 are connected to the corresponding device connectors 21 one by one. The intelligent power device 22 controls the function of the connection target device 40.

The controller 23 is an electronic component that controls power supplied from the power supply 10 to the device connectors 21. The controller 23 outputs a control signal to each intelligent power device 22. Each intelligent power device 22 controls the amount of power supplied to the corresponding device connector 21 based on the control signal from the controller 23.

The controller 23 includes a storage unit 23a. The storage unit 23a stores a table in which the type of the connection target device 40 and identification information (to be described in detail later) of the connection target device 40 are associated. Here, the "type of connection target device 40" is a category that distinguishes each of the connection target devices 40 mounted on the vehicle. In the embodiment, the types of connection target devices 40 include the air conditioner unit 41, the headlamp unit 42, the combination switch 43, the optional device 44, and the sub power supply box 20a. Also, for example, when the headlamp unit mounted on the right side of the vehicle and the headlamp unit mounted on the left side of the vehicle are separated as separate devices, the type of the connection target device 40 is a category in which each of the headlamp units which are mounted on the left and right of the vehicle is distinguished. The storage unit 23a stores identification information of the connection target device 40 that can be connected to the power supply box 20 in advance. In addition, the storage unit 23a can additionally store the type of the connection target device 40 not stored in the storage unit 23a and the identification information of the connection target device 40.

The controller 23 includes, for example, a central processing unit such as a micro processing unit (MPU) that mainly executes arithmetic processing, a memory (a random access memory (RAM), an electrically erasable programmable read only memory (EEPROM)) as the storage unit 23a, and an electronic circuit based on a known microcomputer including an interface.

The switch 30a has a function of switching between a cut off and a permission of power supplied to the plurality of device connectors 21 in the power supply box 20. The switch 30a of the embodiment is provided in a diagnostic tool 30. The diagnostic tool 30 is a vehicle diagnostic machine. The diagnostic tool 30 is used, for example, when detecting vehicle information such as a failure point in a vehicle dealership, a vehicle maintenance factory, or the like. The power supply box 20 of the embodiment has a diagnosis connector 24. The diagnostic tool 30 is connected to the power supply box 20 via the diagnosis connector 24.

When the operator operates the diagnostic tool 30 to turn on the switch 30a, the diagnostic tool 30 sends a first command signal to the controller 23 to cut off power supplied to each of the device connectors 21 in the power supply box 20. The controller 23 outputs a control signal to each intelligent power device 22 based on the input first command signal, and cuts off power supplied to the device connectors 21.

In addition, when the operator operates the diagnostic tool to turn off the switch 30a, the diagnostic tool 30 sends a second command signal to the controller 23 to permit power supplied to each of the device connectors 21 in the power supply box 20. The controller 23 outputs a control signal to each intelligent power device 22 based on the input second command signal, and permits power supplied to the device connectors 21.

In the present embodiment, the connection target device 40 is connected to the power supply box 20 via the wiring material. The wiring material of the embodiment includes a power supply line, a ground line, and two inter-wiring communication lines. A mating connector fitted to the device connector 21 is attached to the end of the wiring material, and the mating connector includes a power terminal connected to the power supply line, a ground terminal connected to the ground line, and two communication terminals connected to the respective two inter-wiring communication lines. In addition, the device connector 21 is also provided with a power terminal, a ground terminal, and two communication terminals. When the device connector 21 and the mating connector are fitted, the power terminal, the ground terminal, and the two communication terminals of the device connector 21 are respectively connected to the power terminal, the grounding terminal, and the two communication terminals of the mating connector.

In a USB connector device used for a personal computer etc., when inserting a USB plug into a USB port, first, the power terminal and the ground terminal are in contact, and then the communication terminals are in contact. With this configuration, the USB plug can be inserted into and removed from the USB port in a state of receiving power (hot-swappable).

However, since a general in-vehicle connector is not supposed to be used for hot-swap, it does not have a configuration compatible with hot-swap as in the USB connector device. For example, when the in-vehicle connector is inserted into and removed from the other in-vehicle connector while the power is supplied from the power supply to the in-vehicle connector, for example, an arc discharge may occur between the terminals. Also, in the case of fitting in-vehicle connectors having a plurality of terminals (power terminal, ground terminal, and communication terminal), the order of which terminals are connected may change depending on the degree of inclination of the other connector with respect to the in-vehicle connector.

In the embodiment, the operator can cut off power supplied to the device connector 21 by the switch 30*a* before and after the period in which the connection target device 40 is connected to the device connector 21. At this time, communication between the power supply box 20 and the connection target device 40 is also cut off by the switch 30*a*. By cutting off the power supplied to the device connectors 21 by the switch 30*a*, the connector of the connection target device 40 can be connected in a state where power is not supplied to the device connectors 21. Therefore, even when a general in-vehicle connector is used as the device connector 21, it is possible to suppress the occurrence of arc discharge between the terminal of the device connector 21 and the terminal of the connector of the connection target device 40. That is, after power supplied to the device connectors 21 is cut off by the switch 30*a*, the connection target device 40 is connected to each of the device connectors 21, whereby hot swapping can be suppressed.

Further, when power supplied from the power supply 10 to the respective device connectors 21 is permitted by the switch 30*a*, the controller 23 performs a connection target validation process. The connection target validation process is a process of identifying the type of the connection target device 40 connected to each of the device connectors 21 and identifying the position of the device connector 21 to which the connection target device 40 is connected. In the connection target validation process, the controller 23 of the power supply box 20 acquires identification information of the connection target device 40 connected to each of the device connectors 21.

In the embodiment, the identification information includes the communication ID uniquely set in advance for the connection target device 40 and the current value of the identification current flowing to the connection target device 40. The communication ID is an identifier used when the controller 23 identifies the connection target device 40 in a case where the controller 23 and the connection target device 40 communicate with each other. The controller 23 acquires a communication ID by communicating with the connection target device 40. In the case of the connection target device 40 connected to the power supply box 20 via the sub power supply box 20*a*, the controller 23 acquires the communication ID of the connection target device 40 acquired by a controller 23*s* of the sub power supply box 20*a* by communicating with the controller 23*s*.

The identification current is a current that the connection target device 40 temporarily flows to its own circuit at a predetermined current value during the connection target validation process. For example, when the connection target device 40 is a load device (41 to 44), the identification current is a current that flows through the circuit of the electronic control unit 40*a* of the connection target device 40 at a predetermined current value. Also, for example, when the connection target device 40 is the sub power supply box 20*a*, the identification current is a current that flows through the circuit of the controller 23*s* of the sub power supply box 20*a* at a predetermined current value. The current value of the identification current is preset for each connection target device 40. For example, the current value of the identification current is set according to the type of each connection target device 40. For example, the current value of the identification current is set to a different current value for the type of each connection target device 40.

For example, the connection target device 40 includes an identification circuit which is a circuit that supplies an identification current. The intelligent power device 22 outputs power at a constant voltage to the identification circuit during the connection target validation process, and detects the current value of the current flowing from the output of the intelligent power device 22 to the identification circuit. The configuration of the identification circuit (for example, the resistance of the circuit) differs depending on the type of each connection target device 40 according to the current value of the identification current. The current value of the current flowing from the output of the intelligent power device 22 to the identification circuit is the current value of the identification current set for the type of each connection target device. The controller 23 acquires the current value of the identification current of the connection target device 40 by acquiring information of the current value detected by the intelligent power device 22 through communication. At this time, the controller 23 AD-converts the current value (current value of the identification current) flowing to the output of the intelligent power device 22 to acquire identification information on the current value of the identification current. In the case of the connection target device 40 connected to the power supply box 20 via the sub power supply box 20*a*, information on the current value of the identification current in the connection target device 40 acquired by the sub power supply box 20*a* is acquired from the controller 23*s* of the sub power supply box 20*a*.

The storage unit 23*a* of the embodiment stores a table in which the type of the connection target device 40, the communication ID of the connection target device 40, and the current value of the identification current of the connection target device 40 are associated with each other. The controller 23 performs the connection target validation process based on the table stored in the storage unit 23*a* and the identification information (the communication ID and the current value of the identification current of the connection target device 40) acquired by the controller 23. The controller 23 identifies the type of the connection target device 40 based on the table and the communication ID in the connection target validation process. In the embodiment, the controller 23 acquires the communication ID from the connection target device 40, refers to the table stored in the storage unit 23*a*, and finds out the type of the connection target device 40 corresponding to the communication ID. For example, when the connection target device 40 is connected to each of the plurality of device connectors 21, the controller 23 acquires the communication ID of each connection target device 40, and identifies the type of each connection target device 40 based on the table and each communication ID. As a result, the type of the connection target device 40 connected to each of the device connectors 21 is identified.

Further, the controller 23 identifies the position of the device connector to which the connection target device 40 is connected based on the table and the current value of the identification current. In the embodiment, the controller 23 acquires the current value of the identification current flowing in the circuit of the connection target device 40 connected to the device connector 21. Here, for example, when the connection target device 40 is connected to each of the plurality of device connectors 21, the controller 23 acquires the current value of the identification current of each of the plurality of connection target devices 40. The controller 23 refers to the table stored in the storage unit 23a, and associates the acquired plurality of current values of the identification current with the types of the connection target devices 40 connected to respective device connectors 21. Because the current value of the identification current is obtained from the intelligent power device 22 connected to each of the plurality of device connectors 21, the position of the device connector 21 to which the connection target device 40 whose type is identified is connected can be identified by identifying the type of connection target device 40 corresponding to the current value of the identification current. Through the connection target validation process, the controller 23 recognizes the type of the connection target device 40 connected to each of the plurality of device connectors 21 and the position of the device connector 21 to which the connection target device 40 is connected.

In the connection target validation process, the controller 23 may identify the type of the connection target device 40 and the position of the device connector 21 to which the connection target device 40 is connected based on the table and the current value of the identification current of the connection target device 40. In this case, after identifying the type of the connection target device 40 and the position of the device connector 21 to which the connection target device 40 is connected, the controller 23 validates the type of the connection target device 40 identified based on the table and the communication ID of the connection target device 40.

The specification such as the allowable power value of the power supply line for the wiring material that connects the power supply box 20 and the connection target device 40 is the specification corresponding to the power supplied to each connection target device 40. The controller 23 supplies power to the device connector 21 at a power value according to the connection target device 40 connected to the device connector 21 and the wiring material connecting the connection target device 40 and the power supply box 20. Further, the controller 23 performs setting so that the fuse function of the intelligent power device 22 operates according to the specifications of the connection target device 40 and the wiring material. For example, the controller 23 supplies power at a power value at which the fuse function of the intelligent power device 22 operates in order to suppress the flow of a current exceeding either lower one of the allowable power value of the wiring material and the allowable power value of the connection target device 40 with respect to the connection target device 40. In the embodiment, the allowable power of the wiring material and the allowable power value of the connection target device 40 are stored in the storage unit 23a in association with the type of the connection target device 40. For example, the controller 23 recognizes the connection target device 40 newly connected to the power supply box 20 and the connection target device 40 whose device connector 21 to be connected was changed according to the connection target validation process, and updates the setting for the control of the connection target devices 40 depending on the type of connection target device 40 and the identified connection position of the connection target device 40.

<Description of Control Example of In-Vehicle System>

Principal control of the in-vehicle system 1 according to the embodiment will be described with reference to FIG. 2. FIG. 2 is a flowchart illustrating an example of control performed by the in-vehicle system according to the embodiment. When the control illustrated in FIG. 2 is performed, the diagnostic tool 30 provided with the switch 30a is connected to the power supply box 20.

First, the controller 23 of the power supply box 20 determines whether the switch 30a is turned ON (Step S1). As illustrated in FIG. 2, when the switch 30a is turned OFF, the controller 23 performs Step S1 again. When the controller 23 recognizes that the switch 30a is turned ON, the controller 23 cuts off power supplied to the respective device connectors 21 (Step S2). In the embodiment, when the controller 23 recognizes that the switch 30a is turned ON, the controller 23 outputs a first command signal that causes each intelligent power device 22 to cut off power supplied to the respective device connectors 21. Each intelligent power device 22 cuts off power supplied from the power supply 10 to the device connector 21 based on the first command signal for cutting off the power supply.

Next, the connection target device 40 is connected to the device connector 21 (Step S3). For example, the operator connects the connection target device 40 to the device connector 21 to which the connection target device 40 is not connected, and adds the connection target device 40 with respect to the power supply box 20. Also, for example, the operator may disconnect the connection target device 40 from the device connector 21 to which the connection target device 40 is already connected to connect another connection target device 40.

Next, the controller 23 determines whether the switch 30a is turned OFF (Step S4). If the controller 23 recognizes that the switch 30a is turned ON, the controller 23 returns to Step S2 and maintains the state in which power supplied to each device connector 21 is cut off. When the operator turns OFF the switch 30a and the controller 23 recognizes that the switch 30a is turned OFF, the controller 23 permits power supplied to the device connectors 21 (Step S5). In the embodiment, when the controller 23 recognizes that the switch 30a is turned OFF, the controller 23 outputs a second command signal that causes each intelligent power device 22 to permit power supplied to the respective device connectors 21. Each intelligent power device 22 resumes power supply from the power supply 10 to the respective device connectors 21 based on the second command signal for permitting the power supply.

The controller 23 performs the connection target validation process when the switch 30a permits power supplied to the device connectors 21 (Step S6). The controller 23 performs the connection target validation process based on the table stored in the storage unit 23a and the identification information output to the power supply box 20. In the embodiment, in the connection target validation process, the controller 23 identifies the type of the connection target device 40 based on the table and the communication ID. Further, the controller 23 identifies the position of the device connector to which the connection target device 40 is connected based on the table and the current value of the identification current. After completing the connection target validation process, the controller 23 causes, for example, a monitor of the diagnostic tool 30 or the like to display the type of the connection target device 40 connected to the device connector 21 and information on the position of the device connector 21 to which the connection target device 40 is connected. In addition, when the controller 23 recognizes an abnormal connection as in the case where a plurality of connection target devices 40 having the same identification information is connected, the controller 23 may display a notification indicating an error on the monitor of the diagnostic tool 30 or the like. Further, when recognizing an abnormal connection, the controller 23 may cut off the supply of power from the power supply 10 to the device connectors 21 again.

Thereafter, the controller 23 changes the setting of the power in the power supply box 20 (Step S7). For example, in Step S7, the controller 23 supplies power to the device connector 21 identified in Step S6 at an electric power value adapted to the connection target device 40 connected to the device connector 21 and the wiring material connecting the device connector 21 and the connection target device 40. The controller 23 stores the changed setting in the storage unit 23a.

As explained above, an in-vehicle system 1 according to the embodiment includes a power supply box 20 provided in a vehicle, and having a plurality of device connectors 21 and a controller 23 that supplies, to the plurality of device connectors 21, power received from a power supply, and a switch 30a that switches between a cut off and a permission of power supplied to the plurality of device connectors 21 in the power supply box 20. When power supplied to the device connectors 21 is permitted by the switch 30a, the controller 23 performs a connection target validation process of identifying a type of a connection target device 40 connected to each of the device connectors 21 and a position of the device connector 21 to which the connection target device 40 is connected.

In the in-vehicle system 1 according to the embodiment, power supplied to the device connectors 21 in the power supply box 20 can be cut off by the switch 30a. When power supplied to the device connectors 21 is permitted by the switch 30a, the controller 23 performs the connection target validation process. Even when the connection target device 40 is connected to the device connector 21 at any position among the plurality of device connectors 21, the controller 23 can recognize and control the connection target device 40 according to the connection target validation process. With this configuration, according to the in-vehicle system 1 of the embodiment, the effect is provided such that the connection target device 40 can be easily added with respect to the power supply box 20.

Further, in the in-vehicle system 1 according to the embodiment, the controller 23 includes a storage unit 23a that stores a table in which a type of the connection target device 40 is associated with identification information of the connection target device 40, and the connection target validation process performed by the controller 23 includes acquiring the identification information of the connection target device 40 connected to each of the device connectors 21, and based on the table and the identification information stored in the storage unit 23a, identifying the type of the connection target device 40 connected to each of the device connectors 21 and the position of the device connector 21 to which the connection target device 40 is connected.

The storage unit 23a can newly add the type and identification information of the connection target device 40 to the table and store them. For example, even if the type and identification information of the connection target device 40 to be added are not stored in advance as a table in the power supply box 20, this can be coped with by the storage unit 23a newly storing the type and identification information of the connection target device 40.

Further, in the in-vehicle system 1 according to the embodiment, the identification information includes a communication ID uniquely set in advance for the connection target device 40 and a current value of an identification current flowing to the connection target device, and in the connection target validation process, the controller 23 identifies the type of the connection target device 40 based on the table and the communication ID, and the position of the device connector 21 to which the connection target device is connected based on the table and the current value of the identification current. Identification of the type of the connection target device 40 and identification of the position of the device connector 21 to which the connection target device is connected can be made precisely by using a plurality of pieces of information (the communication ID and the current value of the identification current) as identification information.

Further, in the in-vehicle system 1 according to the embodiment, the identification information includes a communication ID uniquely set in advance for the connection target device 40 and a current value of an identification current flowing to the connection target device 40, and in the connection target validation process, the controller 23 identifies the type of the connection target device 40 identified based on the table and the communication ID after identifying the type of the connection target device 40 and the position of the device connector 21 to which the connection target device 40 is connected based on the table and the current value of the identification current of the connection target device 40. Identification of the type of the connection target device 40 and identification of the position of the device connector 21 to which the connection target device is connected can be made precisely by using the communication ID as validation information.

Further, in the in-vehicle system 1 according to the embodiment, the switch 30a is provided in a diagnostic tool 30, the diagnostic tool 30 is connected to the diagnosis connector 24 provided in the power supply box 20, and the switch 30a switches between a cut off and a permission of power supplied to the plurality of device connectors 21.

Further, in the in-vehicle system 1 according to the embodiment, the plurality of device connectors 21 has an identical configuration with each other. Therefore, for example, the headlamp unit 42 can be removed from the device connector 21 to which the headlamp unit 42 is connected, and the air conditioner unit 41 can be connected to the device connector 21. That is, the power supply box 20 in the in-vehicle system 1 according to the embodiment can share (standardize) the plurality of device connectors 21. Further, for example, when the new connection target device 40 is mounted on a vehicle, the connection target device 40 can be connected to the device connector 21 at any position among the plurality of device connectors 21. Therefore, the connection target device 40 can be easily added or changed.

In addition, the in-vehicle system according to the embodiments of this invention mentioned above is not limited to the embodiments mentioned above, and various modifications are possible in the range described in the claims.

For example, in the above-described embodiment, the configuration in which the controller 23 includes the storage unit 23a that stores a table in which the type of the connection target device 40 is associated with the identification information of the connection target device 40 is described as an example, but the present invention is not limited to this configuration. For example, the storage unit 23a may be provided in the power supply box 20 as a member different from the controller 23.

For example, in the above-described embodiment, the configuration in which the switch 30a is provided in the diagnostic tool 30 is described as an example, but the present invention is not limited to this configuration. For example, the switch 30a may be connected to the power supply box 20 as a member different from the diagnostic tool 30.

For example, in the above-mentioned embodiment, the configuration in which the plurality of device connectors 21 is the same is described as an example, but the present invention is not limited to this configuration. For example, the shape, structure, and size of the device connector 21 may be different from each other.

In the in-vehicle system according to the present embodiment, power supplied to the device connector in the power supply box can be cut off by the switch. The controller performs the connection target validation process when power supplied to the device connector is permitted by the switch. With the configuration, according to the in-vehicle system of the present embodiment, the effect is provided such that the connection target device can be easily added with respect to the power supply box.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle system comprising:
a power supply box provided in a vehicle, and having a plurality of device connectors and a controller that supplies, to the plurality of device connectors, power received from a power supply; and
a switch that switches between a cut off and a permission of power supplied to the plurality of device connectors in the power supply box, wherein
when power supplied to the device connectors is permitted by the switch, the controller performs a connection target validation process of identifying a type of a connection target device connected to each of the device connectors and a position of the device connector to which the connection target device is connected,
the controller includes a storage unit that stores a table in which a type of the connection target device is associated with identification information of the connection target device,
the connection target validation process performed by the controller includes acquiring the identification information of the connection target device connected to each of the device connectors, and based on the table and the identification information stored in the storage unit, identifying the type of the connection target device connected to each of the device connectors and the position of the device connector to which the connection target device is connected,
the identification information includes a communication ID uniquely set in advance for the connection target device and a current value of an identification current flowing to the connection target device, and
in the connection target validation process further includes, identifying the type of the connection target device based on the table and the communication ID, and the position of the device connector to which the connection target device is connected based on the table and the current value of the identification current, or identifying the type of the connection target device identified based on the table and the communication ID after identifying the type of the connection target device and the position of the device connector to which the connection target device is connected based on the table and the current value of the identification current of the connection target device.

2. The in-vehicle system according to claim 1, wherein the switch is provided in a diagnostic tool, and
the diagnostic tool is connected to a diagnosis connector provided in the power supply box, and the switch switches between a cut off and a permission of power supplied to the plurality of device connectors.

3. The in-vehicle system according to claim 2, wherein the plurality of device connectors has an identical configuration with each other.

4. The in-vehicle system according to claim 1, wherein the plurality of device connectors has an identical configuration with each other.

5. The in-vehicle system according to claim 1, further comprising:
a plurality of intelligent power devices connected to the corresponding device connectors one by one, wherein,
the intelligent power devices, during the connection target validation process, outputs power at a constant voltage to an identification circuit of the corresponding connection target devices and detect a current value of a current flowing from an output of the intelligent power devices to the identification circuits, respectively,
the controller acquires the current value detected by the intelligent power devices as the current value of the identification current.

6. The in-vehicle system according to claim 5, wherein the controller sets a fuse function of each of the plurality of intelligent power devices according to the type of the connection target device and an identified position of the connection target device.

* * * * *